(12) United States Patent
Randolph (10) Patent No.: US 6,634,449 B2
(45) Date of Patent: Oct. 21, 2003

(54) ACCESS HATCH REINFORCEMENT MODULE & METHOD OF INSTALLING AN ACCESS HATCH TO AN EXISTING HOOD FOR A MOBILE VEHICLE

(75) Inventor: Craig L. Randolph, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 34 days.

(21) Appl. No.: 09/734,517

(22) Filed: Dec. 12, 2000

(65) Prior Publication Data

US 2001/0027624 A1 Oct. 11, 2001

Related U.S. Application Data

(60) Provisional application No. 60/170,086, filed on Dec. 9, 1999.

(51) Int. Cl.[7] .............................................. B62D 25/10
(52) U.S. Cl. ................................ 180/69.24; 180/89.17; 114/203
(58) Field of Search ............................ 180/69.24, 69.2, 180/69.21, 89.17; 49/502; 296/146.1, 97.22; 114/203, 201 R (56) References Cited

U.S. PATENT DOCUMENTS

| | | | | |
|---|---|---|---|---|
| 2,789,525 A | * | 4/1957 | Aarvold | 114/203 |
| 3,419,099 A | * | 12/1968 | Brumbaugh et al. | 180/69.24 |
| 3,583,513 A | * | 6/1971 | Macadam et al. | 180/69.24 |
| 3,743,045 A | * | 7/1973 | Hansen | 180/69.24 |
| 4,071,107 A | * | 1/1978 | Leighty | 180/69.24 |
| 4,394,044 A | * | 7/1983 | Hough et al. | 296/218 |
| 4,846,089 A | * | 7/1989 | Cedergreen | 114/201 R |
| 5,137,327 A | * | 8/1992 | Edmonds et al. | 296/224 |
| 5,222,287 A | * | 6/1993 | Cooper | 29/401.1 |
| 5,365,697 A | * | 11/1994 | Vanderpan | 49/380 |
| 5,836,638 A | * | 11/1998 | Slocum | 296/97.22 |
| 6,334,277 B1 | * | 1/2002 | Condino | 49/381 |

* cited by examiner

Primary Examiner—Brian L. Johnson
Assistant Examiner—Bryan R. Fischmann
(74) Attorney, Agent, or Firm—Jeffery P. Calfa; Dennis Kelly Sullivan; Susan L. Lukasik (57) ABSTRACT

An access hatch reinforcement module and a method of assembling an access hatch to an existing engine compartment hood of a vehicle. The access hatch reinforcement module includes a wall engagement component for engagement to the hood outer wall of the engine compartment hood. The access hatch reinforcement module further includes a door engagement component for engagement to a hatch door of the access hatch. The wall engagement component and the door engagement component of the access hatch reinforcement module are directly fixedly engaged to one another by temporary fixed engagements. The wall engagement component and the door engagement component are also indirectly engaged to one another through operational door connecting components such as a hinge component. The wall engagement component and the door engagement component are engaged to the hood outer wall and the portion of the hood outer wall that is engaged to the door engagement component is separated from the portion of the hood outer wall that is engaged to the wall engagement component. Thereafter the hatch door, which is comprised of what was the portion of the hood outer wall that was engaged to the door engagement component, is supported in a properly aligned manner within a newly formed hatch opening.

24 Claims, 5 Drawing Sheets

ACCESS HATCH REINFORCEMENT MODULE & METHOD OF INSTALLING AN ACCESS HATCH TO AN EXISTING HOOD FOR A MOBILE VEHICLE

This is a non-provisional application claiming priority under provisional patent application Serial No. 60/170,086 filed Dec. 9, 1999.

BACKGROUND

This invention relates to wall assemblies for structures. In particular, this invention relates to wall assemblies that have access hatches. Such wall assemblies generally comprise a wall that defines a hatch opening. It is well known to construct wall assemblies of structures with access hatches that can be selectively opened or closed to allow or prevent passage of objects, individuals, or substances through the hatch opening of the wall between different sides of the wall. The access hatch generally comprises a hatch door that may be closed or in other words positioned over the hatch opening to prevent passage of objects through the hatch opening between opposite sides of the wall. Most such access hatches have operational door connecting components that can be engaged to a door engagement component and also engaged to a wall engagement component. The door engagement component is a component that is to be engaged directly or indirectly to the hatch door of the access hatch when construction of the wall assembly is complete. In some cases the door engagement component is, in fact, the hatch door itself. The wall engagement component is a component that is to be engaged directly or indirectly to the wall when construction of the wall assembly is complete. In some cases the wall engagement component is, in fact, the wall itself. The operational door connecting components serve to support the hatch door in certain positions relative to the hatch opening when they are engaged to the hatch door and the wall. The operational door connecting components may comprise various designs of latches, hinges, linkages, and brackets that can be engaged to the hatch door and the wall. The construction of the wall, the hatch door, and the operational door connecting components generally allows for selective positioning of the hatch door in a position covering the hatch opening or in one or more positions exposing the hatch opening. It is also known to construct these components such that the components may be selectively engaged to one another in a manner such that the hatch door is maintained in certain positions relative to the hatch opening. For instance, some access hatch assemblies include latches that can be selectively engaged to maintain the hatch door in a position substantially covering the hatch opening or disengaged to allow movement of the hatch door to positions exposing the hatch opening.

Various methods of making and assembling walls that have access hatches are well known. Known methods of constructing wall assemblies with access hatches include making the wall which defines a hatch opening, the hatch door, the door engagement component, the wall engagement component, and the operational door connecting components prior to assembling these components into a unit. During the assembly of the components of the wall assembly to one another there are numerous opportunities for error in the relative positioning of the components. If a great deal of error in the position of the components relative to one another occurs during assembly of the wall assembly, the access hatch often does not function properly. One common problem that results from errors in assembly of the wall assembly is misalignment or poor alignment of the hatch door with the hatch opening defined by the wall. The process of constructing a wall assembly with an access hatch as described above is used to produce such a wall assembly for many types of structures. One structure for which it is well known to produce a wall assembly with such an access hatch in such a manner is the body components of a vehicle and an engine compartment hood in particular. Such access hatches for engine compartment hoods of vehicles allow the hatch door to be selectively positioned over the hatch opening to isolate the engine compartment from undesirable elements of the environment or to be positioned to expose the hatch opening to allow access to the engine compartment.

SUMMARY

A primary object of the invention is to provide a cost effective wall assembly with an access hatch and a method of assembling the wall assembly and access hatch that allows for repeatable assembly of the components in a manner that will allow for proper functioning of the components.

The wall assembly of the present invention comprises a wall. The wall assembly of the present invention is to include an access hatch which makes it possible to selectively allow or prevent the passage of objects, substances, or individuals through a hatch opening, from one side of the wall to the other. When the construction of the wall assembly is complete, the wall defines a hatch opening, which if left uncovered allows for the passage of objects through the hatch opening from one side of the wall to the other. In the completed wall assembly, a hatch door is mounted adjacent the wall by operational door connecting components. The operational door connecting components serve to mount the hatch door adjacent the wall. The construction and engagement to one another of the wall, the hatch door, and the operational door connecting components is such that the hatch door can be selectively closed (positioned to substantially cover the hatch opening) or opened (positioned to expose the hatch opening). A hatch opening perimeter structure is constructed during the construction and assembly of the wall assembly. The hatch opening perimeter structure is a structure that is to be disposed adjacent to outer bounds of the hatch opening when the wall assembly is complete. The hatch opening perimeter structure may be constructed integrally with other portions of the wall upon initial construction of the wall or the hatch opening perimeter structure may be constructed separate from the wall initially and engaged to the wall at a later time. During the construction of the wall assembly, the hatch door of the access hatch is temporarily fixedly engaged in its closed position to the hatch opening perimeter structure by temporary fixed engagements. Subsequent to the hatch door being fixedly engaged in its closed position to the hatch opening perimeter structure, one or more of the operational door connecting components are engaged to both the hatch opening perimeter structure and the hatch door. These operational door connecting components are engaged to the hatch door and the hatch opening perimeter structure in the same manner in which they would be engaged to these components to maintain the hatch door in its closed position after final assembly of the wall assembly. After these operational door connecting components are engaged to the hatch door and the hatch opening perimeter structure in this manner, the temporary fixed engagements of the hatch door to the hatch opening perimeter structure are separated. Thus, after the temporary fixed engagements of the hatch door to the hatch opening perimeter structure are separated, the hatch door is supported adjacent the hatch opening by the operational door connecting components engaged to the hatch door and the hatch opening perimeter structure. Construction of a wall assembly and an access hatch therefor according to the structure and methods described above all but assures that the hatch door can be supported by the operational door connecting components in a manner properly aligned with the hatch opening in its closed position.

Thus, it can be seen that the above-mentioned objects of the invention, as well as others not mentioned, have been met.

DRAWINGS

Other objects and advantages of the invention will become more apparent upon perusal of the detailed description thereof and upon inspection of the drawings in which.

DETAILS OF INVENTION

Referring now to the figures in detail, there is shown a wall assembly 21 for use in some type of structure. The wall assembly 21 of the present invention comprises a wall 10. The wall assembly 21 of the present invention is to include an access hatch 12 which makes it possible to selectively allow or prevent the passage of objects, substances, or individuals through a hatch opening 13, from one side of the wall 10 to the other. The wall 10 of the present invention may be virtually any component that has unbroken portions 20 that prevent direct passage of objects from areas adjacent the unbroken portions 20 of the wall 10 to areas on opposite sides of the unbroken portions 20 of the wall 10. When the construction of the wall assembly 21 is complete, the wall 10 defines a hatch opening 13, which if left uncovered, allows for the passage of objects through the hatch opening 13 from one side of the wall 10 to the other. The hatch opening 13 is, more specifically defined between inner bounds 57 of hatch opening perimeter structure 24 that is engaged to a portion of the wall 10 adjacent the hatch opening 13. When the wall assembly 21 is C completely constructed, a hatch door 14 is mounted adjacent the wall 10 by operational door connecting components 15. The operational door connecting components 15 serve to mount the hatch door 14 adjacent the wall 10. The construction and engagement to one another of the wall 10, the hatch door 14, and the operational door connecting components 15 is such that the hatch door 14 can be selectively closed (positioned to substantially cover the hatch opening 13) or opened (to expose the hatch opening 13). It should be mentioned that, for purposes of this disclosure, the hatch door 14 may have other structures attached to it that move with it when it is moved between its open position and its closed position and those other structures are not necessarily considered to be part of the hatch door 14.

The construction and engagement to one another of the hatch door 14 and the hatch opening perimeter structure 24 may be of many different designs. As was mentioned above, according to the present invention, the hatch door 14 and the hatch opening perimeter structure 24 are to be temporarily fixedly engaged to one another before operational door connecting components 15 are engaged to them. The hatch door 14 and the hatch opening perimeter structure 24 may be constructed and temporarily fixedly engaged to one another in any of a number of ways that would allow for the construction of the wall assembly 21 according to the present invention. In the preferred embodiment, prior to the separation of the temporary fixed engagements 21 of the hatch door 14 to the hatch opening perimeter structure 24, the wall assembly 21 comprises a continuous sheet 26 a portion of which that is disposed within a hatch door periphery 28 the hatch door 14 comprises and a portion of which that is disposed outside the hatch door periphery 28 the hatch opening perimeter structure 24 comprises. A portion of the continuous sheet 26 outside the hatch door periphery 28 is, in fact, part of the hatch opening perimeter structure 24. The temporary fixed engagements 27 comprise fixed engagement of a portion of the continuous sheet 26 that is part of the hatch door 14 to a portion of the continuous sheet 26 that is part of the hatch opening perimeter structure 24 at the hatch door periphery 28. As can be inferred from the discussion set forth immediately above, for purposes of this disclosure, as soon as all of the structure that will constitute the hatch door 14 in a completed wall assembly 21 is present in the form that it will have in the completed wall assembly 21, that structure is considered to constitute a hatch door 14 whether or not the hatch opening perimeter structure 24 and/or other structures are integrally and/or otherwise fixedly attached to the structure that constitutes the hatch door 14. For instance, if a hatch door 14 and hatch opening perimeter structure 24 are simultaneously integrally created as part of a continuous sheet 26, as is described above, the structure inside the hatch opening perimeter structure 24 is considered to be a hatch door 14 from the moment that construction of the continuous sheet 26 is completed, which obviously occurs before separation of the hatch door 14 from the hatch opening perimeter structure 24. In addition to the fixed engagement of the two portions of the continuous sheet 26 to one another, there may be other temporary fixed engagements 27 of the hatch door 14 to the hatch opening perimeter structure 24. Alternatively, the temporary fixed engagements 27 of the hatch door 14 to the hatch opening perimeter structure 24 may consist only of the fixed engagement of the two portions of the continuous sheet 26 to one another. As was mentioned above, after operational door connecting components 15 are engaged to both the hatch door 14 and the hatch opening perimeter structure 24, the temporary fixed engagements 27 of the hatch door 14 to the hatch opening perimeter structure 24 are to be separated. In the preferred embodiment, the portion of the continuous sheet 26 that is part of the hatch door 14 is separated from the portion of the continuous sheet 26 that is part of the hatch opening perimeter structure 24 at the hatch door periphery 28. The hatch door periphery 28 is considered to be outer portions of the hatch door 14 or portions of the hatch door 14 that will be the outer portions of the hatch door 14 after separation of the hatch door periphery 28 from the hatch opening perimeter structure 24. The continuous sheet 26 is separated at the hatch door periphery 28 by shearing, fracturing, or cutting the two portions of the continuous sheet 26 from each other. In the preferred embodiment, the hatch door 14 is separated from the hatch opening perimeter structure 24 by cutting the hatch door 14 from the hatch opening perimeter structure by using a router. Upon separation of the hatch door 14 from the hatch opening perimeter structure 24 in such a manner, the hatch opening 13 is defined between inner bounds 29 of the hatch opening perimeter structure 24. Because the hatch door 14 is separated from the hatch opening perimeter structure 24 in this manner, the hatch door 14 has a very similar shape as and is just slightly smaller than the hatch opening 13. As mentioned above, the hatch door 14 is temporarily fixedly engaged to the hatch opening perimeter structure 24 in a position properly aligned with the hatch opening perimeter structure 24 before the operational door connecting components 15 are engaged between the components. As a result, it is all but completely assured that, after separation of the temporary fixed engagements 27, the hatch door 14 can be supported adjacent the hatch opening perimeter structure 24 by the operational door connecting components 15 in a properly aligned manner.

In the preferred embodiment, some of the operational door connecting components 15 are connected to the hatch door 14 and the hatch opening perimeter structure 24 indirectly. In this embodiment, the operational door connecting components 15 are engaged to the hatch opening perimeter structure 24 and the hatch door 14 through hatch engagement components 61. Hatch engagement components 61 include wall engagement components 23 and door engagement components 22. Each hatch engagement component 61 is comprised of a hatch engagement component body 62. In this embodiment a door engagement component 22 is engaged to the hatch door 14 and a wall engagement component 23 is engaged to the hatch opening perimeter structure 24. The door engagement component 22 and the hatch door 14 may be constructed of any of a number of different materials and may be engaged to one another in any of a number of different ways. In the preferred embodiment, the door engagement component 22 and the hatch door 14 are made of materials such as plastics, composites, or fiberglass materials. The components are preferably engaged to one another by bonding the components to one another in ways that it is well known to bond components made of such materials for use in vehicle bodies. The wall engagement component 23 and the hatch opening perimeter structure 24 may be constructed of any of a number of different materials and may be engaged to one another in any of a number of different ways. In the preferred embodiment, the wall engagement component 23 and the hatch opening perimeter structure 24 are made of materials such as plastics, composites, or fiberglass materials. The components are preferably engaged to one another by bonding the components to one another in ways that it is well known to bond components made of such materials for use in vehicle bodies. One or more of the operational door connecting components 15 that are engaged to both the hatch door 14 and the hatch opening perimeter structure 24 are engaged to the door engagement component 22 and the wall engagement component 23. One or more of the operational door connecting components 15 may be engaged only to the door engagement component 22 and the wall engagement component 23 and would, thus, be engaged only indirectly to the hatch door 14 and the hatch opening perimeter structure 24. Preferably, but not necessarily, the wall engagement component 23 is fixedly engaged to the hatch opening perimeter structure 24 and the door engagement component 22 is fixedly engaged to the hatch door 14. The wall engagement component 23 and the door engagement component 22 are engaged to one another indirectly through their engagement to the one or more operational door connecting components 15 and their engagement to the hatch opening perimeter structure 24 and the hatch door 14, respectively. In the preferred embodiment, during the construction of the wall assembly 21, the wall engagement component 23 and the door engagement component 22 are temporarily fixedly engaged to one another directly by temporary fixed engagements between them. The temporary fixed engagements between these components facilitate the assembly of the components. The temporary fixed engagements must, however, be separated before construction of the wall assembly 21 and access hatch 12 thereof is complete in order to permit proper functioning of the access hatch 12. Before construction of the wall assembly 21 is complete, and after the one or more operational door connecting components 15 are engaged to them, the temporary fixed engagements between the wall engagement component 23 and the door engagement component 21 are separated. This is necessary to allow for proper functioning of the access hatch 12. Preferably, the wall engagement component 23 and the door engagement component 22 are temporarily fixedly engaged to one another by tabs 40 that extend between the wall engagement component 23 and the door engagement component 22. Each of the one or more tabs 40 has a middle portion 53 disposed between its terminal end portions 54 that are fixedly engaged to the wall engagement component 23 and the door engagement component 22. Preferably, when the wall engagement component 23 and the door engagement component 22 are temporarily fixedly engaged to one another, the tabs 40 extend between the wall engagement component 23 and the door engagement component 22 in a position such that the middle portion 53 of each of the tabs 40 is disposed adjacent the hatch door periphery 28. Separation of the temporary fixed engagements of the wall engagement component 23 to the door engagement component 22 is preferably accomplished by severing the tabs 40 at points adjacent the hatch door periphery 28. The tabs 40, may, in fact, be severed adjacent the hatch door periphery 28 at the same time that the hatch door 14 is separated from the hatch opening perimeter structure 24 at the hatch door periphery 28. In the preferred embodiment, the fixed engagements of the wall engagement component 23 to the door engagement component 22 through the tabs 40 is the only temporary fixed engagement of the wail engagement component 23 to the door engagement component 22. As a result, during the process of assembling the wail assembly 21, once the tabs 40 are severed, the wall engagement component 23 is only engaged to the door engagement component 22 by operational door connecting components 15 engaged between them.

The tabs 40 that may be utilized to temporarily fixedly engage the wall engagement component 23 to the door engagement component 22 may also serve to facilitate alignment of the door engagement component 22 to the wall engagement component 23 during assembly of the wall assembly 21 and the access hatch 12 thereof. The wall engagement component 23 and the door engagement component 22 may be created simultaneously as an integral component. Alternatively, the wall engagement component 23 and the door engagement component 22 may be created separately and thereafter temporarily fixedly engaged to one another. In the preferred embodiment, the wall engagement component 23 and the door engagement component 22 are created independently from one another. In the preferred embodiment, one or more tabs 40 are initially created with and are integrally engaged to the wall engagement component 23 and/or the door engagement component 22 Each of the tabs 40 that is integrally engaged to either the wall engagement component 23 or the door engagement component 22 has an outer terminal end 60. The outer terminal end 60 of these tabs 40 is disposed opposite an end of the tabs 40 integrally engaged to either the wall engagement component 23 or the door engagement component 22. Also, in the preferred embodiment, the structures of the wall engagement component 23 and/or the door engagement component 22 define tab recesses 41 that are complimentary to the tabs 40. Both tab(s) 40, and complimentary recess(s) 41 of the wall engagement component 23 and the door engagement component 22 may be considered tab alignment features. The wall engagement component 23 and the door engagement component 23 are preferably constructed such that the tab alignment features of the respective components are complimentary to one another. In order for a tab alignment feature of one component to be considered complimentary to a tab alignment feature of another component the tab alignment features must be constructed and positioned so that they may be engaged to one another. In other words, complimentary tab alignment features must comprise a complimentary recess 41 defined by one component and a tab 40 engaged to the other component in a position such that the tab 40 may be received within the complimentary recess 41. In the preferred embodiment the wall engagement component 23 and the door engagement component 22 comprise a plurality of complimentary tab alignment features that may be engaged to one another simultaneously. Also, in the preferred embodiment, when each one of the plurality of complimentary tab alignment features are simultaneously engaged to one another the wall engagement component 23 and the door engagement component 22 are positioned in the position in which they are to be in when temporarily fixedly engaged. The construction of the wall engagement component 23 and the door engagement component 22 is preferably such that when the tabs 40 are disposed within the tab recesses 41, movement of the components relative to one another in directions parallel to hatch door outer surfaces 42 is considerably restricted. In the preferred embodiment, the restriction of relative movement between these components is caused by abutment in directions parallel to the hatch door outer surfaces 42 between the tabs 40 and surfaces of the tab recesses 41 within which the tabs 40 are disposed. In order to effect this result, the construction of the components is such that relatively small gap(s) are present between one or more tabs 40 and surfaces of the recess(s) 41 within which they are disposed in each of the directions parallel to the hatch door outer surfaces 42. Thus, small relative movements of the wall engagement component 23 and the hatch engagement component 22 in directions parallel to the hatch door outer surfaces 42 cause the tabs 40 to abut surfaces of the recesses 41 and prevent further relative movement of the components. As a result, the tabs 40 and tab recesses 41 facilitate the realization and maintenance of proper alignment of the door engagement component 22 with the wall engagement component 23 prior to these components being temporarily fixedly engaged to one another.

In an embodiment of the present invention in which the wall engagement component 23 and the door engagement component 22 are created independent of one another and subsequently temporarily fixedly engaged to one another, there are a number of ways that the components can be fixedly engaged to one another. Means by which the components may be fixedly engaged to one another include but are not limited to fastening, welding, gluing, and other types of bonding.

The wall assembly 21 may further include means for sealing the hatch door 14 to the hatch opening perimeter structure 24 when the hatch door 14 is in its closed position. This sealing structure that may be included in the wall assembly 21 helps to prevent passage of objects or substances through gaps that may be present between the hatch door 14 and the hatch opening perimeter structure 24. In the preferred embodiment a seal component 51 is engaged to either the hatch door 14, the hatch opening perimeter structure 24, or structure engaged to the hatch opening perimeter structure 24. The seal component 51 is positioned such that, when the hatch door 14 is in its closed position, the seal component 51 is sandwiched between the hatch door 14 and either the hatch opening perimeter structure 24, or structure engaged to the hatch opening perimeter structure 24. Thus, the seal component 51 fills gaps that exist between the hatch door 14 and either the hatch opening perimeter structure 24 or structure engaged to the hatch opening perimeter structure 24. The seal component 51, thus, helps to prevent the passage of such things as dust and moisture through the gaps that the seal component 51 fills. Construction of access hatches 12 with seal components 51 in such a manner is well known.

The wall assembly 21 and the components of the wall assembly 21 may be constructed for use as part of any of a number of different kinds of structures. In the preferred embodiment, the wall assembly 21 and the components of the wall assembly 21 are constructed for use as part of a vehicle 29. Such a vehicle 29 generally includes a frame 31 to which a high percentage of the components of the vehicle 29 are directly or indirectly engaged. The frame 31 generally serves to locate most of the components of the vehicle 29 relative to one another. The vehicle 29 also includes a suspension system 32 that is engaged to the frame 31. The suspension system 32 is constructed to support the frame 31 and to provide the vehicle 29 with a relatively low rolling resistance along the ground. The vehicle 29 may have a powertrain engaged to the frame 31 and the suspension system 32 for providing motivation for the vehicle 29 along the ground. The vehicle 29 would also likely include one or more body structures 34. The body structures 34 of the vehicle are generally constructed for containment of objects within themselves and/or to provide isolation from undesirable elements of the environment for objects and/or individuals that are in certain positions relative to the body structures 34. The body structures 34 of the vehicle 29 are generally mounted to and supported by the frame 31 of the vehicle 29.

Figure 4:
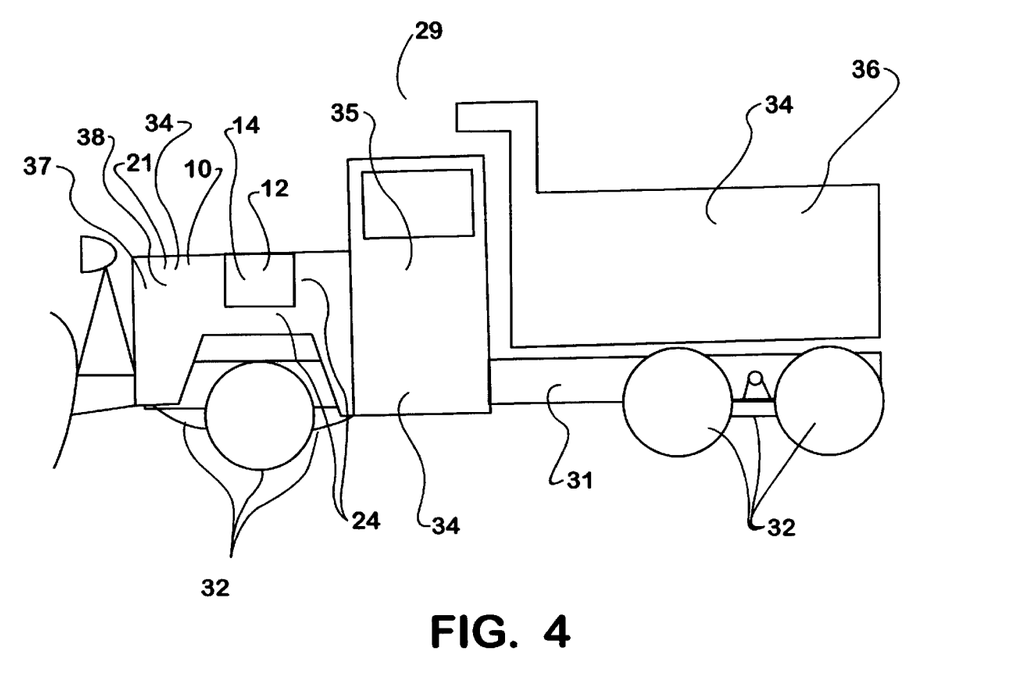
FIG. 4 is a side view of a vehicle with an engine compartment hood that has an access hatch according to the present invention.

Yet another type of body structure 34 that a vehicle 29 might have is an engine compartment hood 37. An engine compartment hood 37 is a body structure 34 that is disposed on one or more sides of (including above, below, in front of, behind, and beside) an engine which is part of the powertrain of the vehicle 29. The engine compartment hood 37 is constructed and positioned relative to the engine of the vehicle 29 in any of a number of well known ways such that the engine compartment hood 37 helps to isolate the engine of the vehicle 29 from undesirable elements of the environment. Engine compartment hoods 31 are generally constructed with a hood outer wall 38 that is disposed on one or more sides of the engine of the vehicle 29. The hood outer wall 38 prevents objects, and substances from travelling from places on a side of the hood outer wall 38 opposite the engine to a side of the outer wall 38 on which the engine is disposed. In many cases, the engine compartment hood 31 also includes hood reinforcing structure engaged to the hood outer wall 38. The purpose of the hood reinforcing structure, being to stiffen and strengthen the engine compartment hood 37. Construction of engine compartment hoods 37 according to these and/or other guidelines is well known. In the preferred embodiment, the wall assembly 21 of the present invention and the components of the wall assembly 21 are engine compartment hood components. In other words, the wall assembly 21 and the components of the wall assembly 21 are constructed to be part of the engine compartment hood 37 of the vehicle 29. In such an application, the wall 10 of the wall assembly 21 is engaged directly or indirectly to the hood outer wall 38 of the engine compartment hood 37. In fact, the wall 10, of the wall assembly 21, defines a portion of the hood outer wall 38 of the engine compartment hood 37. An engine compartment hood 37 constructed with the wall assembly 21 of the present invention also comprises the access hatch 12 of the present invention. When the hatch door 14 is in its closed position, the hatch door 14 prevents objects and substances from passing from a side of the wall 10 opposite the engine, through the hatch opening 13 to a same side of the wall 10 as the engine. The access hatch 12 and the engine compartment hood 37 are constructed such that when the hatch door 14 is in its open position, passage of objects from one side of the wall 10 to the other through the hatch opening 13 is permitted in both directions. In other words, the components of the engine compartment hood 37, other than the hatch door 14, are constructed and positioned so as to not obstruct passage of objects through the hatch opening 14 of the access hatch 12 from one side of the wall assembly 21 to the other. Thus, when the hatch door 14 is in its open position, it is possible to access and perform maintenance procedures on the engine of the vehicle 29 from a side of the wall opposite the engine. Such an engine compartment hood 37 may be constructed and engaged to the vehicle 29 in a manner allowing movement of the entire engine compartment hood 37, including the access hatch 12, to an open position to allow for even greater access to the engine of the vehicle 29. The hatch opening perimeter structure 24 and the hatch door 14, which are initially temporarily fixedly engaged to one another, may be created integrally with the rest of the hood outer wall 38 when the hood outer wall 38 is created. Alternatively, the hatch opening perimeter structure 24 and the hatch door 14 may be created independently of the hood outer wall 38 and engaged to the hood outer wall 38 after the creation of the hood outer wall 38. In the preferred embodiment, the hood outer wall 38, the hood reinforcing structure 39, the hatch opening perimeter structure 24, and the hatch door 14 are constructed of fiberglass, plastic, and composite type materials as it is well known to do for engine compartment hoods 37 of heavy truck vehicles 29. Also, in the preferred embodiment, many of these components that are constructed of such materials are bonded to one another using techniques for bonding such materials together that are well known.

The operational door connecting components 15 may be constructed and engaged to the other components of the wall assembly 21 in any of a number of different ways easily imagined by one of ordinary skill in the art. Any construction of operational door connecting components 15 and engagement of them to the other components of the wall assembly 21 that meets the functional requirements for the operational door connecting components 15 after assembly of the wall assembly is complete would be satisfactory. These functional requirements are that the operational door connecting components 15 must be able to support the hatch door 14 in its closed position relative to the hatch opening perimeter structure 24, and allow for movement of the hatch door 14 from its closed position. The operational door connecting components 15 may or may not be constructed to also support the hatch door 14 in positions other than its closed position relative to the hatch opening perimeter structure 24. The hatch door 14 the hatch opening perimeter structure 24, may be constructed and engaged to one another in a manner allowing for movement of the hatch door 14 between its open and closed position when the components are engaged to one another. Alternatively, the construction and engagement of the hatch door 14, the hatch opening perimeter structure 24, and the operational door connecting components 15 may require disengagement of one or more of the components from one another in order to permit movement of the hatch door 14 from its closed position. The operational door connecting components 15 may comprise various types of linkages, hinges, latches, fasteners, brackets and other types of components well known for use in supporting hatch doors 14 relative to hatch opening perimeter structure 24. In the preferred embodiment, the operational door connecting components 15 include a hatch hinge 43 that is engaged directly or indirectly to the hatch door 14 and the hatch opening perimeter structure 24. The hatch hinge 43 is engaged to the hatch door 14 and the hatch opening perimeter structure 24 in a manner such that the hatch door 14 is supported relative to the hatch opening perimeter structure 24 by the hatch hinge 43. The hatch hinge 43 is engaged to these components in a manner such that the hatch hinge 43 allows for and supports the hatch door 14 during pivoting of the hatch door 14 about a hinge axis 44 relative to the hatch opening perimeter structure 24. Thus, the hatch door 14 can be pivoted between its closed position and any of a number of positions away from its closed position in which the hatch opening 13 is exposed by the hatch door 14.

The wall engagement component 23 and the door engagement component 22 might be constructed and engaged to the components of the access hatch 12 in a manner to provide substantial reinforcement for the hatch door 14 and the hatch opening perimeter structure 24, respectively. In order to provide such reinforcement, the wall engagement component 23 and the door engagement component 22 would be constructed with a substantially greater strength and stiffness in certain modes than the hatch door 14 and the hatch opening perimeter structure 24, respectively. The wall engagement component 23 and the door engagement component 22 may be constructed in any of a number of ways, easily imagined by one of ordinary skill in the art, that would enable them to reinforce the hatch door 14 and the hatch opening perimeter structure 24. In order to properly serve as a reinforcement, the wall engagement component 23 must be constructed with a relatively high stiffness and strength against buckling in directions parallel to the hatch door outer surfaces 42 and against bending in directions perpendicular to the hatch door outer surfaces 42. In order to properly serve as a reinforcement, the door engagement component 23 must also be constructed with a relatively high stiffness and strength against buckling in directions parallel to the hatch door outer surfaces 42 and against bending in directions perpendicular to the hatch door outer surfaces 42. By saying that the wall engagement component 23 and the door engagement component 22 must have a relatively high stiffness and strength it is meant that their stiffness and strength must be considerably greater than that of the components they are intended to reinforce. It is preferable that each wall engagement component 23 has points of engagement to the hatch opening perimeter structure 24 that are separated by a considerable distance, so that large spans of the hatch opening perimeter structure 24 are reinforced by the wall engagement component 23. It is also preferable that the door engagement component 22 has points of engagement to the hatch door 14 that are near the hatch door outer periphery 28 so that substantially the entire span of the hatch door 14 is reinforced by the door engagement component 22. In the preferred embodiment, the wall engagement component 23 comprises an opening perimeter reinforcement loop 47. The opening perimeter reinforcement loop 47 comprises a first reinforcement loop body 55. The first reinforcement loop body 55 extends along a first loop body centroidal curve 56. A majority of portions of the hatch opening perimeter structure 24 adjacent an inner bound 57 of the hatch opening perimeter structure 24 have some portion of the first loop reinforcement loop body 55 engaged to them. In order to make this possible, the first reinforcement loop body 55 must be constructed such that the shape of the first loop body centroidal curve 56 has a shape very similar to the shape of the inner bound 57 of the hatch opening perimeter structure 24. The opening perimeter reinforcement loop 47 is constructed such that a majority of cross-sections of the first reinforcement loop body 55 perpendicular to the first loop body centroidal curve 56, have a relatively high section modulus about axes perpendicular to the first loop body centroidal curve 56. Thus, the opening perimeter reinforcement loop 47 stiffens and strengthens the hatch opening perimeter structure 24 against bending in directions perpendicular to the first loop body centroidal curve 56 and against buckling in directions parallel to the first loop body centroidal curve 56. In the preferred embodiment, the door engagement component 22 comprises a door reinforcement loop 49. The door reinforcement loop 49 comprises a second reinforcement loop body 58 that extends along a second loop body centroidal curve 59. A majority of portions of the hatch door 14 adjacent the hatch door periphery 28 have some portion of the door reinforcement loop 49 engaged to them. In order to make this possible, the second reinforcement loop body 58 must be constructed such that the shape of the second loop body centroidal curve 56 has a shape very similar to the shape of the hatch door periphery 28 of the hatch door 14. The construction of the door reinforcement loop 49 is such that substantially all cross-sections of the second reinforcement loop body 58 perpendicular to the second loop body centroidal curve 59 have a relatively high section modulus about axes perpendicular to the second loop body centroidal curve 59. Thus, the door reinforcement loop 49 stiffens and strengthens the hatch door 14 against bending in directions perpendicular to the second loop body centroidal curve 59 and against buckling in directions parallel to the second loop body centroidal curve 59. In the preferred embodiment, the opening perimeter reinforcement loop 47 is created as a single unitary piece with no assembly required after creation. In the preferred embodiment, the door reinforcement loop 49 is also created as a single unitary piece with no assembly required after creation. In the past many such reinforcement structures for hatch doors 14 and hatch opening perimeter structures 24 were assembled by fastening, welding or otherwise engaging a multitude of independently created components together. Thus, because no assembly of the opening perimeter reinforcement loop 47 or the door reinforcement loop 49 is required, less assembly labor is required of the access hatch 12 of the preferred embodiment than is required for access hatches 12 that include reinforcement components assembled from multiple parts.

The process of assembling the wall assembly 21 of the present invention, preferably includes assembly of an access hatch reinforcement module 52. The access hatch reinforcement module 52 of the present invention comprises a wall engagement component 23, a door engagement component 22, and operational door connecting components 15. The wall engagement component 23 and the door engagement component 22 are preferably, but not necessarily, constructed in a manner such that they may act as reinforcements to the hatch opening perimeter structure 24 and the hatch door 14, respectively. The wall engagement component 23 and the door engagement component 22, of the access hatch reinforcement module 52, are temporarily fixedly engaged to one another in any manner in accordance with the description included in this disclosure of the construction of the temporary fixed engagements of these components. The wall engagement component 23 and the door engagement component 22 are positioned relative to one another in a same position that they would be in relative to one another when the wall assembly 21 is fully assembled and the hatch door 14 is in its closed position. One or more of the operational door connecting components 15 of the access hatch reinforcement module 52 are engaged to both the wall engagement component 23 and the door engagement component 22. The operational door connecting components 15 may be engaged to the wall engagement component 23 and the door engagement component 22 in any manner in accordance with the description contained in this disclosure. In the preferred embodiment, the wall engagement component 23 is temporarily fixedly engaged to the door engagement component 22, before the operational door connecting components 15 are engaged to the wall engagement component 23 and the door engagement component 22.

The process of assembling the wall assembly 21 of the present invention preferably includes engaging the assembled access hatch reinforcement module 52 to the hatch door 14 and the hatch opening perimeter structure 24. The hatch door 14 and the hatch opening perimeter structure 24 are, preferably, temporarily fixedly engaged to one another, as described elsewhere in this disclosure, before the access hatch reinforcement module 52 is engaged to them. The hatch door 14 and the hatch opening perimeter structure 24 are positioned relative to one another in a same position that they would be in relative to one another after assembly of the wall assembly 21 is complete and when the hatch door 14 were in its closed position. Upon initial engagement to one another, the access hatch reinforcement module 52, the hatch door 14, and the hatch opening perimeter structure 24, are positioned relative to one another in the position that they will be in after assembly of the wall assembly 21 is complete and when the hatch door 14 is closed. Preferably, the hatch door 14, the hatch opening perimeter structure 24, and the wall 10 of the wall assembly are a single integrally created component before engagement of the access hatch reinforcement module 52 to them. It should be noted that, generally, no special construction of the engine compartment hood 37 or the hood outer wall 38 is necessary in order to enable construction of an access hatch 12 to the engine compartment hood 37 according to the methods and constructions of the present invention. In general, the construction of the access hatch reinforcement module 52 is tailored to the design of an existing engine compartment hood 37, in order to enable construction of an access hatch 12 according to the present invention. Preferably, the hatch door 14 and the hatch opening perimeter structure 24 are portions of a hood outer wall 38 to which the access hatch reinforcement module 52 is engaged before the temporary fixed engagements 27 of the hatch door 14 to the hatch opening perimeter structure 24 are separated. In the preferred embodiment, the portion of the hood outer wall 38 that constitutes the hatch door 14 is simply a portion of the hood outer wall 38 that is in a position where it is desired to position the access hatch 12. In this embodiment, the hatch opening perimeter structure 24 is the portion of the hood outer wall 38 that is disposed outside the hatch door periphery 38. In this embodiment, the temporary fixed engagements 27 of the hatch door 14 to the hatch opening perimeter structure 24 are the integral engagements, that are created with the creation of the hood outer wall 38, between the portion of the hood outer wall 38 that is the hatch door 14 and the portion of the hood outer wall 38 that is the hatch opening perimeter structure 24. After the access hatch reinforcement module 52, the hatch door 14, and the hatch opening perimeter structure 24 are engaged to one another, the temporary fixed engagements 27 between the hatch door 14 and the hatch opening perimeter structure 24 are separated. Also after the access hatch reinforcement module 52, the hatch door 14, and the hatch opening perimeter structure 24 are engaged to one another, the temporary fixed engagements between the wall engagement component 23 and the door engagement component 22 are separated. After the temporary fixed engagements 27 are separated, the hatch door 14 is supported in a properly aligned manner within the hatch opening 13, by the operational door connecting components 15.

Figure 1:
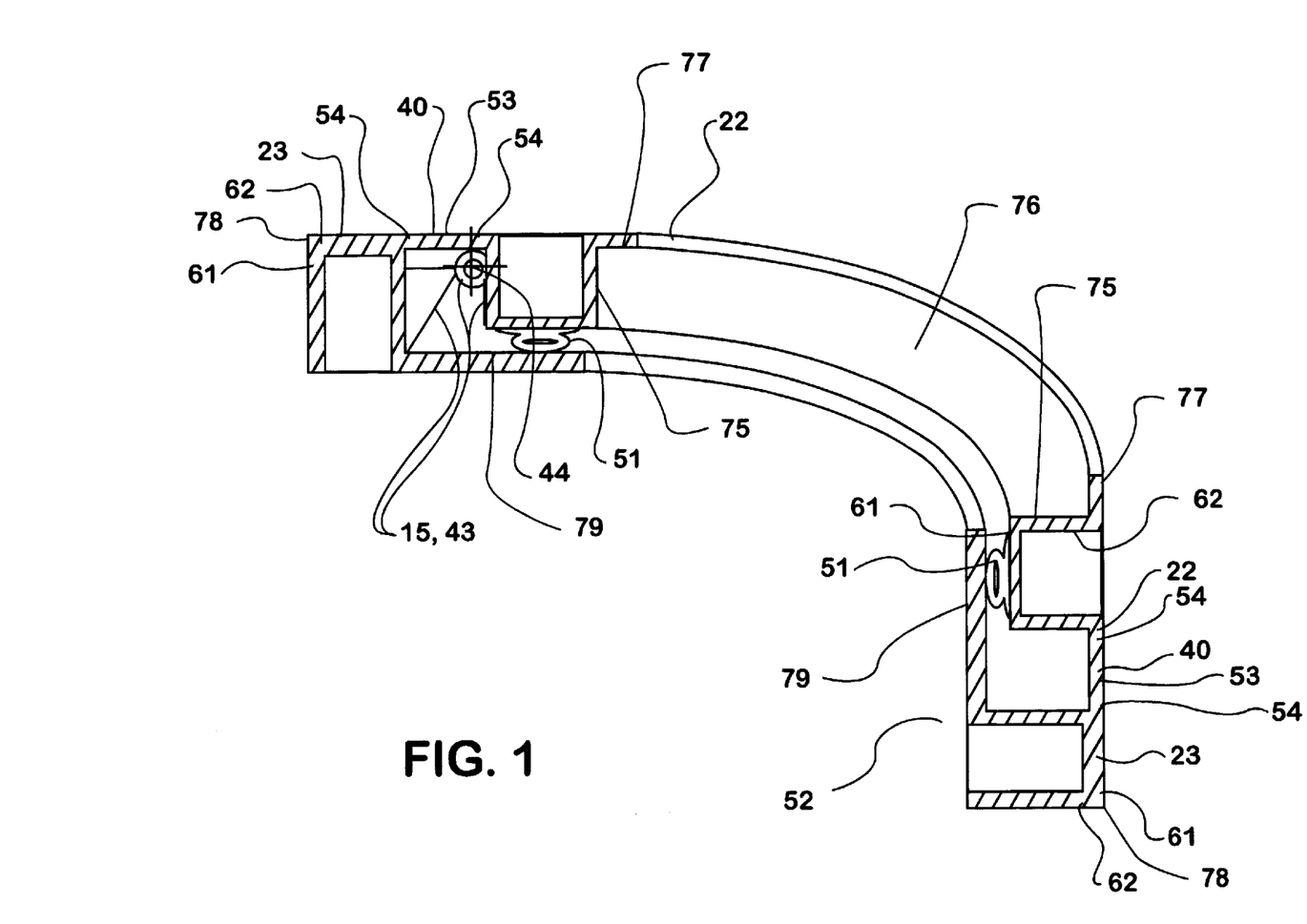
FIG. 1 is a sectional view of the access hatch reinforcement module of the present invention parallel to the orientation that the outer surfaces of the hatch door would have when mounted to the access hatch reinforcement module.
Figure 2:
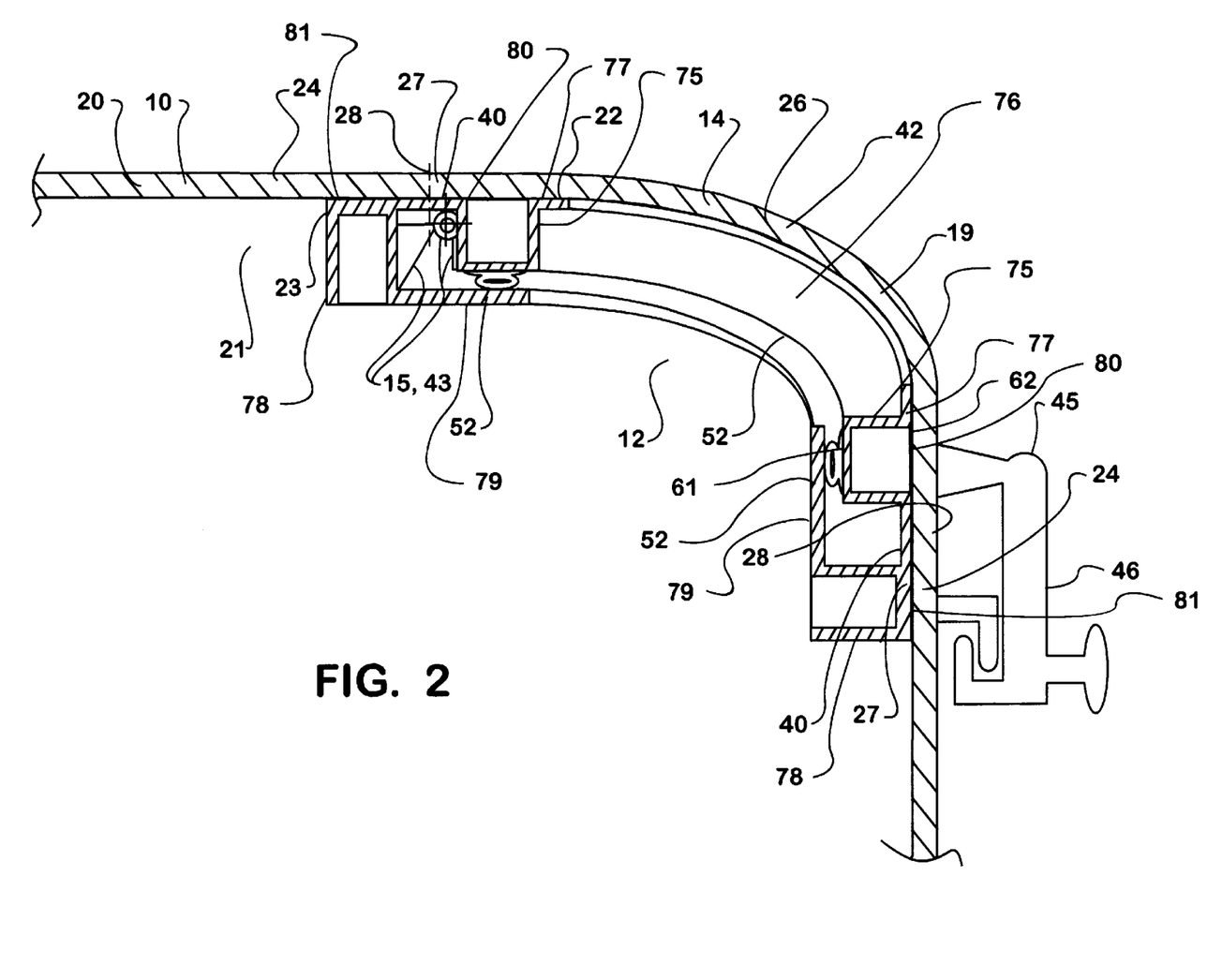
FIG. 2 is a sectional view of the wall assembly and access hatch thereof of the present invention in a direction parallel to the outer surfaces of the hatch door with the temporary fixed engagements of the hatch door to the hatch opening perimeter structure present and The temporary fixed engagements of the wall engagement component to the door engagement component also present.
Figure 3:
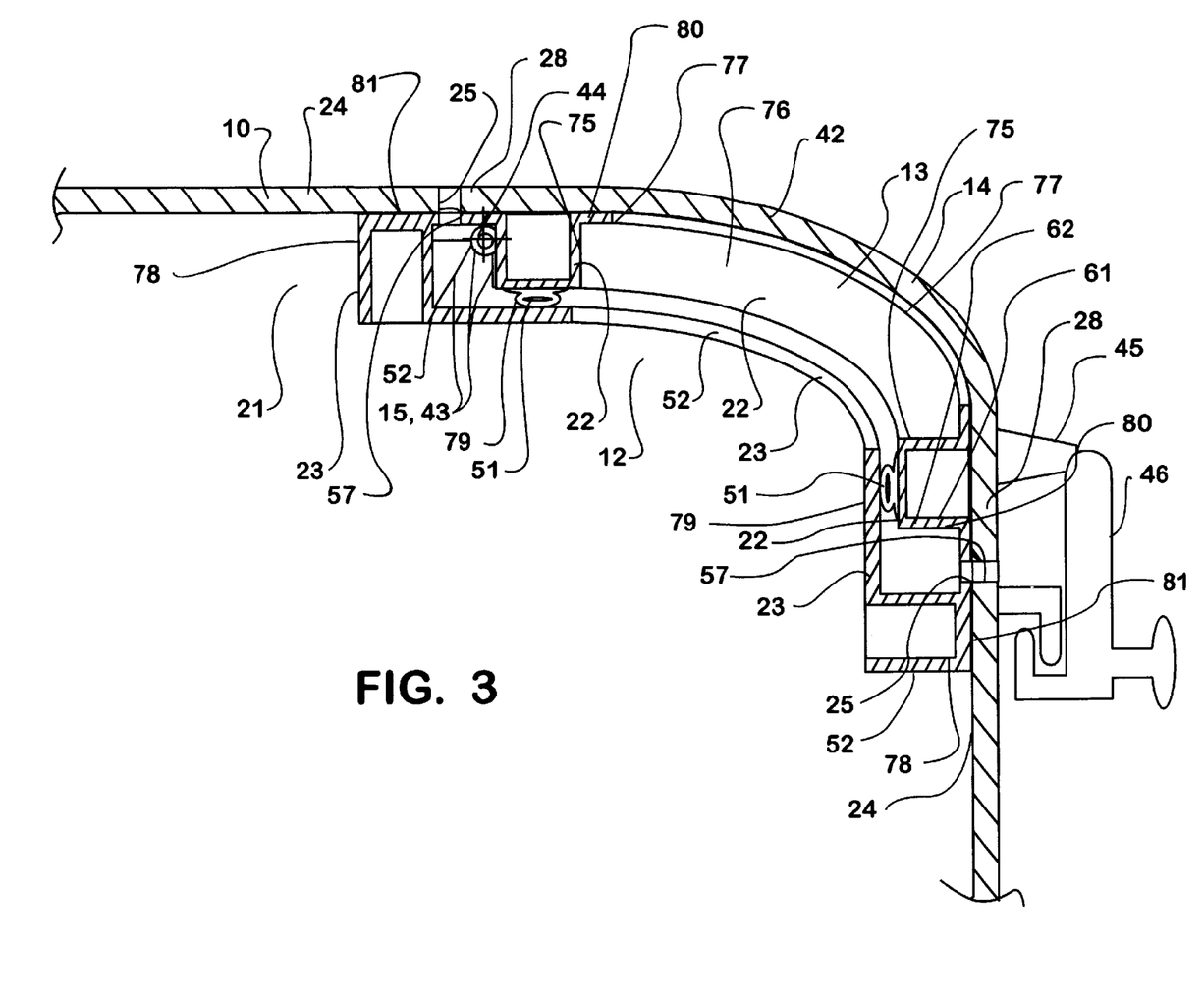
FIG. 3 is a sectional view of the wall assembly and access hatch thereof of the present invention in a direction parallel to the outer surfaces of the hatch door and with the construction of the wall assembly and access hatch thereof complete and with the hatch door in its closed position.
Figure 5:
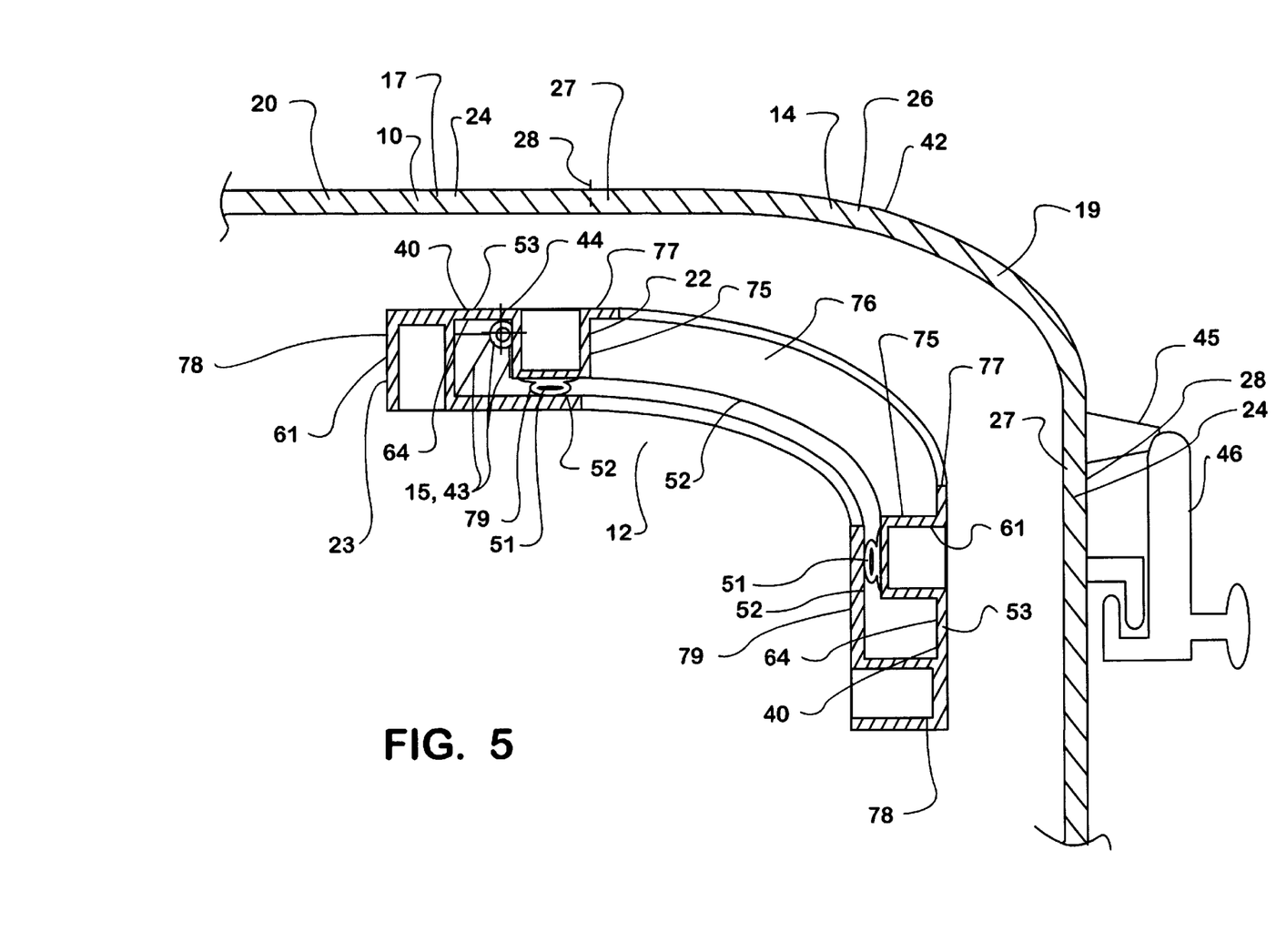
FIG. 5 is a sectional view of subassemblies that can be attached to one another to create the assembly shown in FIG. 1. The subassemblies shown in Fig tire 5 include the access hatch reinforcement module of the construction shown in FIG. 1 and a wall, which comprises a hatch door and hatch opening perimeter structure.

In order to provide the reader with a better understanding of the general principles of the present invention the details of one of innumerable different embodiments of the present invention, the embodiment shown in FIGS. 1–3 and 5, will now be discussed in considerable detail. It will of course be understood that a person of ordinary skill in the art could readily imagine innumerable variations of the present invention that are different from the embodiments illustrated in FIGS. 1–3 and S and that are still within the teachings of and include the essential features of the present invention. FIG. 1 illustrates an access hatch reinforcement module 52. In accordance with the general description of an access hatch reinforcement module 52 set forth above, the access hatch reinforcement module shown in FIG. 1 includes a door engagement component 22, a wall engagement component 23, and an operational door connecting component 15 that is engaged between the door engagement component 22 and the wall engagement component 23. The door engagement component 22 has a body that has a first u-shaped section 75 that extends around an aperture 76 that is defined therewithin. The plane of the drawing of FIG. 1 cuts through two portions of the first u-shaped section 75 of the door engagement component 22 and also through the aperture 76 defined therewithin. The first portion of we first u-shaped section 75 of the door engagement component 22, through which the plane of the drawing of FIG. 1 cuts is disposed upon the upper left-hand side of the aperture 76 and opens upwardly. The second portion of the first u-shaped section 75 of the door engagement component 22, through which the plane of the drawing cuts, is disposed at the lower right-hand side of the aperture 76 and opens to the right. The door engagement component 22 that is shown in FIG. 1 also includes a first lip 77 that extends toward the aperture 76 from the u-shaped section 75 of the body of the door engagement component 22. The wall engagement component 23 That is shown in FIG. 1 has a body that includes a second u-shaped section 78 that extends around the first u-shaped section 75 of the body of the door engagement component 22 on a side of the first u-shaped section 75 of the body of the door engagement component 22 opposite the aperture 76. The plane of the drawing cuts through two portions of the second u-shaped section 78 of the body of the wall engagement component 23 The first portion of the second u shaped section 78 of the body of the wall engagement component 23, through which the plane of the drawing cuts, is disposed in the very upper left-most portion of the drawing and opens downwardly. The second portion of the second u-shaped section 78 of the body of the wall engagement component 23, through which the plane of the drawing cuts, is disposed in the very lower right-most portion of the drawing and opens to the left. The body of the wall engagement component 23 shown in FIG. 1 also comprises a second lip 79 that extends from the u-shaped section toward the aperture 76. The door engagement component 22 and the wall engagement component 23 shown in FIG. 1 are connected by temporary fixed engagements that are effected by tabs 40 that extend between the first u-shaped section 75 of the body of the door engagement component 22 and the second u-shaped section 78 of the body of the wall engagement component 23. In the embodiment of the invention shown in FIG. 1, the door engagement component 22, the wall engagement component 23, and the tabs 40 that effect temporary fixed engagement between the door engagement component 22 and The wall engagement component 23 them are integrally brined of the same body of material. The access hatch reinforcement module 52 shown in FIG. 1 also comprises an operational door connecting component 15 mat happens to be a hatch hinge 43 that is engaged between the first u-shaped section 75 of the body of the door engagement component 22 and The second u-shaped section 78 of the body of the wall engagement component 23. At the stage of construction shown in FIG. 1, the door engagement component 22 and the wall engagement component 23 cannot be moved relative to one another because of the temporary fixed engagements between them that are effected by the tabs 40 that extend between the first u-shaped section 75 of the body of the door engagement component 22 and the second u-shaped section 78 of the body of the wail engagement component 23. At a later stage of construction, as will be described below, the tabs 40 that extend between the first u-shaped section 75 of the body of the door engagement component 22 and the second u-shaped section 78 of the body of the wall engagement component 23 will be severed, but the door engagement component 22 will remain mounted to the wall engagement component 23 Through the operational door connecting component 15 that is the hatch hinge 43. After the tabs 40 are severed in such a manner, the engagement of the door engagement component 22 to the wall engagement component 23 through the operational door connecting component 15 that is the hatch hinge 43 will provide for pivotal movement of the door engagement component 22 relative to the wall engagement component 23 about the hinge axis 44 of the hatch hinge 43, when the state of interaction of any other operational door connecting components 15 such as latches allows such pivotal movement the access hatch reinforcement module 52 shown in FIG. 1 also includes a seal component 51 that is attached to the first u-shaped section 75 of the body of the door engagement component 22 in such a position that the seal component 51 is compressed between it and the second lip 79 of the wall engagement component 23. It will of course be understood that the door engagement component 22 and the wall engagement component 23 of an access hatch reinforcement module 52 according to the present invention could be of an innumerable variety of shapes in addition to the ones shown in FIG. 1. It will also be understood that a door engagement component 22 and wall engagement component 23 according to the present invention may be temporarily fixedly engaged to one another through an innumerable variety of structures other than the tabs 40 that are shown in FIG. 1. It will also be understood that the operational door connecting components 15 that engage the door engagement component 22 and the wall engagement component 23 of an access hatch reinforcement module 52 may have an innumerable variety of forms and may be engaged to the door engagement component 22 and the wall engagement component 23 in an innumerable variety of ways in accordance with the teachings of present disclosure. FIG. 5 shows the access hatch reinforcement module 52 of FIG. 1 in the lower left-hand portion of the drawing ready for attachment to the structure shown in the upper right-hand corner of the drawing. The structure in the upper right-hand portion of FIG. 5 comprises a portion of a wall 10 and also an operational door connecting component 15 which happens to be a latch 45. The particular embodiment of a wall 10 that is shown in FIG. 5 is constituted by a continuous sheet 26. The continuous sheet 26 of the wall 10 shown in FIG. 5 comprises a hatch door 14 that extends between the various portions of the hatch door periphery 28, two of which portions of the hatch door periphery 28 the plane of the drawing cuts through. The continuous sheet 26 also comprises hatch opening perimeter structure 24 that is disposed just outside the hatch door periphery 28. The hatch door 14 and the hatch opening perimeter structure 24 are attached to one another through temporary fixed engagements 27 extending along the entirety of the hatch door periphery 28. The temporary fixed engagements 27 between the hatch door 14 and the hatch opening perimeter structure 24 were created when the hatch door 14 and the hatch opening perimeter structure 24 were created integrally with one another during the formation of the continuous sheet 26 that comprises them. The latch 45 that is attached to the wall 45 has one end engaged to the hatch door 14 and the other end engaged to the hatch opening perimeter structure 24 and thereby engages them to one another. It will of course be understood that the hatch door 14, the hatch opening perimeter structure 24, and the temporary fixed engagements 27 therebetween may have an innumerable variety of designs according to the teachings of this disclosure. FIG. 2 illustrates a wall assembly 21 according to the present invention at a stage of construction just prior to the final steps of the construction process of the present invention. FIG. 2 shows the access hatch reinforcement module 52. That is shown in FIGS. 1 and 5, attached to the wall 10 that is shown in FIG. 5. The door engagement component 22 of the access hatch reinforcement module 52 is attached to the hatch door 14 at a door engagement component/hatch door interface 80 through means such as adhesive. The wall engagement component 23 is attached to the hatch opening perimeter structure 24 at a wall engagement component/hatch opening perimeter structure interface 81 through means such as adhesive. In FIG. 2 the hatch door 14 is indirectly engaged to the hatch opening perimeter structure 24 through the operational door connecting component 15 that is the hatch hinge 43 of the access hatch reinforcement module 52. This engagement is effected through the following chain—the hatch door 14 is attached to the door engagement component 22 at The door engagement component/hatch door interface 80, the door engagement component 22 is engaged to the wall engagement component 23 through the operational door connecting component 15 That is the hatch hinge 43 of the access hatch reinforcement module 52, and finally the wall engagement component 23 is attached to the hatch opening perimeter structure 24 at the wall engagement component/hatch opening perimeter structure interface 81. As was mentioned above, the hatch door 14 is also engaged to the hatch opening perimeter structure 24 through the operational door connecting component 15 that is the latch 45 with opposite ends engaged to the hatch door 14 and the hatch opening perimeter structure 24. The hatch door 14 is also indirectly fixedly engaged to the hatch opening perimeter structure 24 through the fixed engagements between the door engagement component 22 and the wall engagement component 23 that are effected by the tabs 40 that extend therebetween. This indirect fixed engagement of the hatch door 14 to the hatch opening perimeter structure 24 is effected through the following chain of engagements—the hatch door 14 is attached to the door engagement component 22 at the door engagement component/hatch door interface 80, the door engagement component 22 is fixedly engaged to the wail engagement component 23 through the tabs 40 that extend therebetween, and finally the wall engagement component 23 is attached to the hatch opening perimeter structure 24 at the wall engagement component/hatch opening perimeter structure interface 81. Additionally, in FIG. 2, the hatch door 14 is directly fixedly engaged to the hatch opening perimeter structure 24 through the temporary fixed engagements between the two at the hatch door periphery 28. It will of course be understood that the access hatch reinforcement module 52 and the components thereof according to the present invention may be attached to the hatch door 14 and the hatch opening perimeter structure 24 of a wall assembly 21 according to the present invention in any of an innumerable variety of ways that are easily imaginable to a person of ordinary skill in the art to which the present invention relates. FIG. 3 illustrates the wall assembly 21 of FIG. 2 after the final steps of construction have been completed. The completed wall assembly 21 shown in FIG. 3 differs from the uncompleted wall assembly in FIG. 2 in that the completed wall assembly 21 has had both the temporary fixed engagements 27 that existed between the hatch door 14 and the hatch opening perimeter structure 24 at the hatch door periphery 28 and also the temporary fixed engagements that were effected by the tabs 40 that extended between the door engagement component 22 and the wall engagement component 23 severed. As a result of the temporary fixed engagements 27 between the hatch door 14 and the hatch opening perimeter structure 24 at the hatch door periphery 28 having been separated the wall assembly 21 also includes a hatch opening 13 defined inwardly of the hatch opening perimeter structure 24 at the stage of construction shown in FIG. 3, whereas, at the stage of construction shown in FIG. 2 that wall assembly 21 does not include a hatch opening. With the temporary fixed engagements 27 between the hatch door 14 and the hatch opening perimeter structure 24 and the temporary fixed engagements that were effected by the tabs 40 between the door engagement component 22 and the wall engagement component 23 severed, the hatch door 14 is engaged to the hatch opening perimeter structure 24 through only two paths. The hatch door 14 is engaged to the hatch opening perimeter structure 24 through the operational door connecting component 15 that is the hatch hinge 43 as follows—the hatch door 14 is attached to the door engagement component 22 at the door engagement component/hatch door interface 80, the door engagement component 22 is engaged to the wall engagement component 23 through the operational door connecting component 15 that is the hatch hinge 43, and finally the wall engagement component 23 is attached to the hatch opening perimeter structure 24 at the wall engagement component/hatch opening perimeter structure interface 81. The hatch door 14 of the wall assembly 21 shown in FIG. 3 is also connected to the hatch opening perimeter structure 24 through the operational door connecting component 15 that is a latch 45. As a result of the hatch door 14, of the wall assembly 21 shown in FIG. 3, being engaged to the hatch opening perimeter structure 24 in the manner described above, if the latch 45 is disengaged from the hatch opening perimeter structure 24, the hatch door 14 and the door engagement component 22 are free to pivot in unison about the hinge axis 44 of the operational door connecting component 15 that is the hatch hinge 43. If the hatch door 14 were pivoted counterclockwise about the hinge axis 44 of the hatch hinge 43, from the position shown in FIG. 3 to the open position of the hatch door 14, objects could pass from one side of the wall assembly 21 to the other through the hatch opening 13.

Those skilled in the art will appreciate that modifications could be made to the invention as described without departing from the spirit and scope of the invention and thus the scope of the invention is limited only by the following claims.

I claim:

1. An access hatch reinforcement module for assembly to a hatch door which has a hatch door periphery, and hatch opening perimeter structure which has an inner bound, and where the access hatch reinforcement module, the hatch door, and the hatch opening perimeter structure are to be included as parts of a wall assembly, comprising:
   (a) a wall engagement component designed to be engaged to the hatch opening perimeter structure;
   (b) a door engagement component designed to be engaged to the hatch door;
   (c) one or more operational door connecting components;
   (d) wherein temporary fixed engagements temporarily fixedly engage said wall engagement component to said door engagement component;
   (e) wherein one or more of said one or more operational door connecting components are engaged to both said wall engagement component of said access hatch reinforcement module and said door engagement component of said access hatch reinforcement module;
   (f) wherein said operational door connecting components that are engaged to both said wall engagement component and said door engagement component are constructed and engaged to said wall engagement component and said door engagement component in a manner such that said door engagement component would still be mounted to said wall engagement component by said operational door connecting components if said temporary fixed engagements, which temporarily fixedly engage said door engagement component to said wall engagement component were separated;
   (g) wherein said wall engagement component and said door engagement component are positioned relative to one another in a same position as said wall engagement component and said door engagement component would be in relative to one another after assembly of the wall assembly is complete and if the hatch door were positioned in its closed position; and
   (h) wherein one or more of said one or more operational door connecting components are engaged to both said wall engagement component of said access hatch reinforcement module and said door engagement component of said access hatch reinforcement module; and
   (i) wherein one or more of said temporary fixed engagements of said door engagement component to said wall engagement component are effected as a result of one or more tabs extending between and being fixedly engaged to both said door engagement component and said wall engagement component in a temporary manner.

2. The access hatch reinforcement module of claim 1, wherein:
   (a) each one of said one or more tabs that extend between and are fixedly engaged to both said door engagement component and said wall engagement component in a temporary manner has a middle portion disposed between terminal end portions of said tab that are fixedly engaged to said door engagement component and said wall engagement component; and
   (b) said tabs are positioned relative to said wall engagement component and said door engagement component such that, after said access hatch reinforcement module is mounted to the hatch door and the hatch opening perimeter structure, and before said temporary fixed engagements of said wall engagement component to said door engagement component are separated, said middle portion of said tabs is disposed adjacent the hatch door periphery of the hatch door.

3. The access hatch reinforcement module of claim 2, wherein:
   (a) said wall engagement component is constructed such that, said wall engagement component may provide substantial reinforcement for the hatch opening reinforcement module after assembly of the wall assembly is complete; and
   (b) said door engagement component is constructed such that, said door engagement component may provide substantial reinforcement for the hatch door after assembly of the wall assembly is complete.

4. The access hatch reinforcement module of claim 3, wherein:
   (a) said one or more operational door connecting components that are engaged to both said wall engagement component and said door engagement component comprise a hatch hinge engaged to both said wall engagement component and said door engagement component.

5. The access hatch reinforcement module of claim 4, wherein:
   (a) one or more of said tabs that extend between and are temporarily fixedly engaged to both said wall engagement component and said door engagement component are integrally engaged to said wall engagement component and/or said door engagement component;
   (b) of said one or more tabs that are integrally engaged to said wall engagement component and/or said door engagement component each individual tab is integrally engaged to only one of said wall engagement component and said door engagement component;
   (c) said wall engagement component and/or said door engagement component define one or more complimentary recesses; and (d) an outer terminal end of one or more of said tabs that are integrally engaged to said wall engagement component and/or said door engagement component is disposed within a complimentary recess defined by whichever of said wall engagement component and said door engagement component each particular tab is not integrally engaged to.

6. The access hatch reinforcement module of claim 5, wherein:

(a) said wall engagement component is of unitary construction; and (b) said door engagement component is of unitary construction.

7. An access hatch reinforcement module for assembly to a hatch door which has a hatch door periphery, and hatch opening perimeter structure which has an inner bound, and where the access hatch reinforcement module, the hatch door, and the hatch opening perimeter structure are to be included as parts of a wall assembly, comprising:

(a) a wall engagement component designed to be engaged to the hatch opening perimeter structure;

(b) a door engagement component designed to be engaged to the hatch door;

(c) one or more operational door connecting components;

(d) wherein temporary fixed engagements temporarily fixedly engage said wall engagement component to said door engagement component;

(e) wherein one or more of said one or more operational door connecting components are engaged to both said wall engagement component of said access hatch reinforcement module and said door engagement component of said access hatch reinforcement module;

(f) said operational door connecting components that are engaged to both said wall engagement component and said door engagement component are constructed and engaged to said wall engagement component and said door engagement component in a manner such that said door engagement component would still be mounted to said wall engagement component by said operational door connecting components if said temporary fixed engagements, which temporarily fixedly engage said door engagement component to said wall engagement component were separated; and (g) wherein one or more tabs that are integrally engaged to one of said door engagement component and said wall engagement component are engaged to complimentary recesses defined by whichever of said door engagement component and said wall engagement component said one or more tabs are not integrally engaged to.

8. A method of constructing a wall assembly, comprising the steps of:

(a) fixedly engaging a hatch door to hatch opening perimeter structure in a temporary manner with temporary fixed engagements between the hatch door and the hatch opening perimeter structure;

(b) subsequently engaging one or more operational door connecting components to both the hatch door and the hatch opening perimeter structure in a manner such that, were the hatch door and the hatch opening perimeter structure not fixedly engaged to one another, the hatch door would be supported to the hatch opening perimeter structure by its engagement to the hatch opening perimeter structure through the one or more operational door connecting components; and (c) after the one or more operational door connecting components are engaged to both the hatch door and the hatch opening perimeter structure, separating the temporary fixed engagements of the hatch door to the hatch door perimeter structure.

9. The method of claim 8, wherein:

(a) during said step of fixedly engaging the hatch door to the hatch opening perimeter structure the hatch door is fixedly engaged in its closed position relative to the hatch opening perimeter structure.

10. The method of claim 9, wherein:

(a) said step of fixedly engaging the hatch door to the hatch opening perimeter structure more specifically comprises creating the hatch door and the hatch opening perimeter structure out of a unitary sheet that extends beyond a hatch door periphery into and becomes the hatch opening perimeter structure such that the temporary fixed engagements of the hatch door to the hatch opening perimeter structure consist only of integral engagements of the portion of the unitary sheet that is the hatch door to the portion of the unitary sheet that is the hatch opening perimeter structure at the hatch door periphery; and (b) said step of separating the temporary fixed engagements of the hatch door to the hatch opening perimeter structure is accomplished by separating the portion of the unitary sheet that is the hatch door from the portion of the unitary sheet that is the hatch opening perimeter structure, at the hatch door periphery.

11. The method of claim 10, wherein:

(a) the hatch door, the hatch opening perimeter structure, and the operational door connecting components are constructed for use as part of vehicle body structures.

12. The method of claim 11, wherein:

(a) the hatch door, the hatch opening perimeter structure, and the operational door connecting components are constructed for use as part of an engine compartment hood of a vehicle.

13. The method of claim 12, wherein:

(a) said step of engaging the one or more operational door connecting components to both the hatch door and the hatch opening perimeter structure more specifically comprises the steps of:

(i) engaging one or more of the operational door components to both a wall engagement component and a door engagement component;

(ii) either before or after engaging the one or more operational door components to the wall engagement component, engaging the wall engagement component to the hatch opening perimeter structure; and (iii) either before or after engaging the one or more operational door components to the door engagement component, engaging the door engagement component to the hatch door.

14. The method of claim 13, wherein:

(a) said method further comprises the step of fixedly engaging the wall engagement component and the door engagement component to one another in a temporary manner with temporary fixed engagements of the wall engagement component to the door engagement component;

(b) said step of fixedly engaging the wall engagement component to the door engagement component in a temporary manner is performed before the step of engaging the one or more operational door connecting components to the wall engagement component, before the step of engaging the one or more operational door connecting components to the door engagement component, before the step of engaging the wall engagement component to the hatch opening perimeter structure, and before the step of engaging the door engagement component to the hatch door;

(c) said method further comprises the step of separating the temporary fixed engagements of the wall engagement component to the door engagement component; and (d) said step of separating the temporary fixed engagements of the wall engagement components to the door engagement components is performed after the step of engaging the one or more operational door connecting components to the wall engagement component and also after the step of engaging the one or more operational door connecting components to the door engagement component.

15. The method of claim 14, wherein:

(a) said step of fixedly engaging the wall engagement component to the door engagement component in a temporary manner more specifically comprises the step of fixedly engaging each of one or more tabs to both the wall engagement component and the door engagement component in a position such that each of the one or more tabs extends between the wall engagement component and the door engagement component.

16. The method of claim 15, wherein:

(a) said step of fixedly engaging the wall engagement component to the door engagement component in a temporary manner, said step of fixedly engaging the hatch door to the hatch opening perimeter structure in a temporary manner, said step of engaging the door engagement component to the hatch door, said step of engaging the wall engagement component to the hatch opening perimeter structure, said step of engaging the operational door connecting components to the wall engagement component, and said step of engaging the operational door connecting components to the door engagement component are all performed before said step of separating the temporary fixed engagements of the wall engagement component to the door engagement component and also before said step of separating the fixed engagements of the hatch door to the hatch opening perimeter structure;

(b) the components of the wall assembly are constructed in such a manner, and said steps of said method are performed in a manner such that, prior to said step of separating the temporary fixed engagements of the wall engagement component to the door engagement component, and also prior to said step of separating the temporary fixed engagements of the hatch door to the hatch opening perimeter structure, a middle portion of each of the tabs that extends between and is fixedly engaged to the wall engagement component and the door engagement component is disposed adjacent to the hatch door periphery;

(c) said step of separating the temporary fixed engagements of the wall engagement component to the door engagement component more specifically comprises the step of severing the middle portion of each of the tabs that extends between and is fixedly engaged to both the wall engagement component and the door engagement component; and (d) said step of separating the temporary fixed engagements of the hatch door to the hatch opening perimeter structure, which consists of severing the portion of the unitary sheet that is the hatch door from the portion of the unitary sheet that is the hatch opening perimeter structure at the hatch door periphery, is performed simultaneously with said step of severing the middle portion of each of the tabs that extends between and is fixedly engaged to both the wall engagement component and the door engagement component.

17. A method of assembling an engine compartment hood and installing the engine compartment hood to a vehicle, comprising the steps of:

(a) performing the step of constructing an engine compartment hood, which comprises the sub-steps of creating a hood outer wall and simultaneously creating hatch opening perimeter structure and a hatch door integrally with said hood outer wall;

(b) constructing an access hatch reinforcement module comprising the steps of:

(i) fixedly engaging a wall engagement component to a door engagement component in a temporary manner with temporary fixed engagements; and (ii) subsequent to said step of fixedly engaging the wall engagement component to the door engagement component, engaging one or more operational door connecting components to the wall engagement component and the door engagement component in a manner such that if the door engagement component were not fixedly engaged to the wall engagement component by the temporary fixed engagements, the door engagement component would be supported to the wall engagement component by its engagement to the wall engagement component through the one or more operational door connecting components, (c) subsequent to said step of constructing the access hatch reinforcement module, engaging the wall engagement component of the access hatch reinforcement module to the hatch opening perimeter structure;

(d) simultaneous to said step of engaging the wall engagement component to the hatch opening perimeter structure, engaging the door engagement component to the hatch door;

(e) subsequent to said step of engaging the wall engagement component to the hatch opening perimeter structure, and also subsequent to said step of engaging the door engagement component to the hatch door, separating the hatch door from the hatch opening perimeter structure;

(f) subsequent to said step of engaging the wall engagement component to the hatch opening perimeter structure, and also subsequent to said step of engaging the door engagement component to the hatch door, separating the temporary fixed engagements of the door engagement component to the wall engagement component; and (g) engaging the engine compartment hood to the vehicle.

18. The method of claim 17, wherein:

(a) said step of fixedly engaging the wall engagement component to the door engagement component in a temporary manner more specifically comprises the step of fixedly engaging one or more tabs to both the wall engagement component and the door engagement component in a position such that each of the one or more tabs extends between the wall engagement component and the door engagement component.

19. The method of Claim 18, wherein:

(a) the components of the engine compartment hood are constructed in such a manner, and said steps of said method are performed in a manner such that, prior to said step of separating the temporary fixed engagements of the wall engagement component to the door engagement component, and also prior to said step of separating the temporary fixed engagements of the hatch door to the hatch opening perimeter structure, a middle portion of each of the tabs that extends between and is fixedly engaged to the wall engagement component and the door engagement component is disposed adjacent to the hatch door periphery;

(b) said step of separating the temporary fixed engagements of the wall engagement component to the door engagement component more specifically comprises the step of severing the middle portion of each of the tabs that extends between and is fixedly engaged td both the wall engagement component and the door engagement component; and (c) said step of separating the temporary fixed engagements of the hatch door to the hatch opening perimeter structure, which consists of severing the portion of the hood outer wall that is the hatch door from the portion of the hood outer wall that is the hatch opening perimeter structure at the hatch door periphery, is performed simultaneously with said step of severing the middle portion of each of the tabs that extends between and is fixedly engaged to both the wall engagement component and the door engagement component.

20. The method of claim 19, wherein:

(a) the wall engagement component is of unitary construction; and (b) the door engagement component is of unitary construction.

21. The method of claim 20, wherein:

(a) the wall engagement component is constructed such that it provides substantial reinforcement for the hatch opening perimeter structure; and (b) the door engagement component is constructed such that it provides substantial reinforcement for the hatch door.

22. The method of claim 21, wherein:

(a) one or more of said one or more operational door connecting components comprise a hatch hinge that is constructed and engaged to said wall engagement component and said door engagement component in a manner such that said hatch door is mounted to said hatch opening perimeter structure in a manner allowing pivotal relative movement between them about a hinge axis.

23. A method of assembling an access hatch reinforcement module, comprising the steps of:

(a) fixedly engaging a wall engagement component to a door engagement component in a temporary manner with temporary fixed engagements; and (b) subsequent to said step of fixedly engaging the wall engagement component to the door engagement component, engaging one or more operational door connecting components to the wall engagement component and the door engagement component in a manner such that if the door engagement component were not fixedly engaged to the wall engagement component by the temporary fixed engagements, the door engagement component would be supported to the wall engagement component by its engagement to the wall engagement component through the one or more operational door connecting components.

24. The method of claim 23, wherein:

(j) said step of fixedly engaging the wall engagement component to the door engagement component in a temporary manner more specifically comprises the step of fixedly engaging one or more tabs to both the wall engagement component and the door engagement component in a position such that each of the one or more tabs extends between the wall engagement component and the door engagement component.

\* \* \* \* \*